US008416754B2

(12) United States Patent
Venkatsubra et al.

(10) Patent No.: US 8,416,754 B2
(45) Date of Patent: Apr. 9, 2013

(54) NETWORK LOCATION BASED PROCESSING OF DATA COMMUNICATION CONNECTION REQUESTS

(75) Inventors: Venkat Venkatsubra, Austin, TX (US); Richard P. Youngman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/370,015

(22) Filed: Feb. 9, 2012

(65) Prior Publication Data

US 2012/0144036 A1   Jun. 7, 2012

Related U.S. Application Data

(63) Continuation of application No. 11/122,609, filed on May 5, 2005.

(51) Int. Cl.
*H04W 4/00* (2009.01)
*H04L 12/66* (2006.01)
*H04L 12/28* (2006.01)

(52) U.S. Cl. ......... 370/338; 370/352; 370/392; 370/401

(58) Field of Classification Search .................. 370/331, 370/338, 389–392
See application file for complete search history.

(56) References Cited

U.S. PATENT DOCUMENTS

| 7,194,004 | B1 * | 3/2007 | Thomsen ...................... 370/401 |
| 7,305,365 | B1 * | 12/2007 | Bhela et al. ..................... 705/51 |
| 2002/0150083 | A1 * | 10/2002 | Fangman et al. ............. 370/352 |
| 2003/0233576 | A1 * | 12/2003 | Maufer et al. ................. 713/201 |
| 2004/0087274 | A1 * | 5/2004 | Ekberg et al. ................ 455/41.2 |
| 2005/0165932 | A1 | 7/2005 | Banerjee et al. |
| 2006/0187891 | A1 * | 8/2006 | Sairanen ....................... 370/338 |
| 2006/0268874 | A1 | 11/2006 | Venkatsubra et al. |
| 2006/0291434 | A1 * | 12/2006 | Gu et al. ....................... 370/338 |

OTHER PUBLICATIONS

"U.S. Appl. No. 11/122,609 Final Office Action", Jul. 10, 2008, 14 pages.
"U.S. Appl. No. 11/122,609 Office Action", Mar. 3, 2008, 12 pages.
Hidalgo, DS, "Algorithm to Connect Clients to a Database Server Based on the Transmission Control Protocol/Internet Protocol Sockets", IBM TDB v37 n7 07-94 Jul. 1, 1994, pp. 305-308.

* cited by examiner

*Primary Examiner* — Brandon Renner
(74) *Attorney, Agent, or Firm* — DeLizio Gilliam, PLLC

(57) ABSTRACT

Responsive to receiving a request for a data communications connection, a data communications module of a receiver determines whether a sender of the request is local or remote with respect to the receiver. The data communications module also determines whether a location response flag indicates local or remote. If the relative location of the sender with respect to the receiver corresponds with the location response flag, then the data communications connection is allowed. Otherwise, the connection is not allowed.

20 Claims, 8 Drawing Sheets

NETWORK LOCATION BASED PROCESSING OF DATA COMMUNICATION CONNECTION REQUESTS

RELATED APPLICATIONS

This application claims the priority benefit of U.S. application Ser. No. 11/122,609 filed May 5, 2005.

BACKGROUND

Embodiments of the inventive subject matter are directed to data processing, or, more specifically, network location based processing of data communication connection requests.

Standard response messages in data communications protocols by the nature of their standard replies yield information useful to an attacker. Sending a reset message when an attacker requests a connection to a closed port advises the attacker that a communication module is active on the network address, for example. A synchronize message advises the attacker not only that a data communications module exists at the network address but also that an open port is active at that address. The attacker may or may not be able to effect a connection through the intended victim's security restraints, but the attacker now knows something is there to be attacked. Security restraints are typically applied at the application level of the protocol stack. Hostile access of data communications ports cannot currently be mitigated at the level of the transmission protocol or the network protocol.

SUMMARY

Embodiments of the inventive subject matter include a method comprising receiving a request to establish a data communication connection. The request indicates a network address of a sender. It is determined whether the sender is local or remote with respect to a receiver of the request based, at least in part, on the network address of the sender and a network address of the receiver. It is determined whether a location response flag indicates remote or local. The data communication connection is allowed to be established between the sender and the receiver if the location response flag indicates local and the sender was determined to be local with respect to the receiver. The data communication connection is allowed to be established between the sender and the receiver if the location response flag indicates remote and the sender was determined to be remote with respect to the receiver. The data communication connection is prevented from being established between the sender and the receiver if the location response flag indicates remote and the sender was determined to be local with respect to the receiver. The data communication connection is prevented from being established between the sender and the receiver if the location response flag indicates local and the sender was determined to be remote with respect to the receiver.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

INTRODUCTION

The present inventive subject matter is described to a large extent in this specification in terms of methods for administering requests for data communications connections in a wide area network that includes a plurality of networks. Persons skilled in the art, however, will recognize that any computer system that includes suitable programming means for operating in accordance with the disclosed methods also falls well within the scope of the present inventive subject matter. Suitable programming means include any means for directing a computer system to execute the steps of the method of the inventive subject matter, including for example, systems comprised of processing units and arithmetic-logic circuits coupled to computer memory, which systems have the capability of storing in computer memory, which computer memory includes electronic circuits configured to store data and program instructions, programmed steps of the method of the inventive subject matter for execution by a processing unit.

The inventive subject matter also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the inventive subject matter as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present inventive subject matter.

Figure 1:
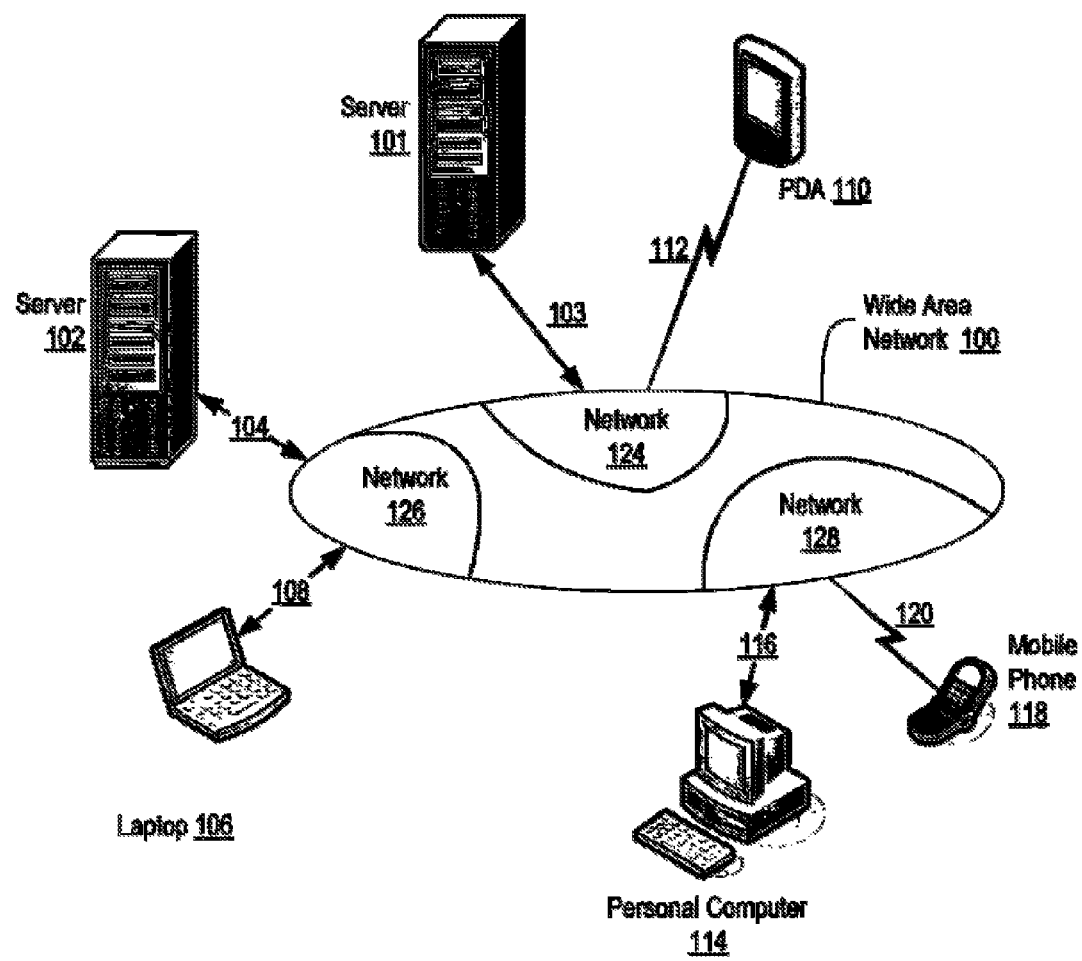
FIG. 1 sets forth a network diagram illustrating an exemplary system for administering requests for data communications connections according to embodiments of the present inventive subject matter.

Administering Requests for Data Communications Connections in a Wide Area Network that Includes a Plurality of Networks Exemplary methods, systems, and products for administering requests for data communications connections according to embodiments of the present inventive subject matter are described with reference to the accompanying drawings, beginning with FIG. 1. FIG. 1 sets forth a network diagram illustrating an exemplary system for administering requests for data communications connections according to embodiments of the present inventive subject matter. The system of FIG. 1 operates generally to administer requests for data communications connections according to embodiments of the present inventive subject matter receiving, by a receiver from a sender, a request for a data communications connection, where the sender has a network address on a sender's network and the receiver has a network address on a receiver's network; characterizing the sender as local or remote with respect to the receiver's network; and responding to the request in dependence upon a value of a location response flag and in dependence upon the characterization of the sender's network with respect to the receiver's network.

The system of FIG. 1 includes a wide area network ('WAN') (100) that includes several networks (124, 126, 128). A WAN is a computer network that spans a relatively large geographical area. Computers connected to a wide-area network are often connected through public networks, telephone networks, internetworks, and so on. They can also be connected through leased lines or satellites. The largest WAN in existence is the Internet, a network of computers that carry out data communications according to the Internet Protocol ('IP'). A WAN typically includes two or more other networks, sometimes referred to as networks or local area networks ('LANs'), but which are referred to generally in this specification as 'networks.' More specifically, a 'network' as the term is used in this specification includes nodes having the same network address. That is, the network portion of the two addresses is the same, including any subnet portion of the address, but excluding the node portion of the network address.

A portion of an address identifies the network to which a node is connected. In a 32-bit class A address, the leftmost 8 bits identify the network and the rightmost 24 bits identify a particular node on that network. In a 32-bit class B address, the leftmost 16 bits identify the network and the rightmost 16 bits identify a particular node on that network. In a 32-bit class C address, the leftmost 24 bits identify the network and the rightmost 8 bits identify a particular node on that network.

The idea of making the boundary between the network and node more flexible is known as 'subnetting.' Each node has a network mask used to identify its network. Each network mask typically is made of some number of contiguous binary 1's beginning at the top of the address, eight 1's for a class A network, sixteen for class B, and so on. Subnetting allows a mask with more than eight 1's for class A, more than sixteen 1's for class B, and more than twenty-four 1's for class C.

The portion of a class A address that has 1's in the bottom three octets of its mask may be called a subnet. For a class B address, the 1 bits in the bottom two octets of the address mask correspond to the subnet. And for a class C address, the 1 bits in the bottom octet correspond to the subnet. Addresses therefore may be viewed as having three fields: a net number, a subnet number, and a node number. In a class B address, for example, the top two octets would be the net portion, any bits in the bottom two octets corresponding to 1's in the mask would be the subnet portion, and the remainder of the bottom two octets would be the node portion of the address.

In this specification, the term 'network' corresponds to the portion of an address that corresponds to 1's in an applicable mask, regardless whether the address includes a subnet. For example therefore in this specification: A class A network without subnetting may be identified by the portion of an address corresponding to the top octet of its mask; A class A network with subnetting and a mask with 1's in its top 12 bits may be identified by the portion of an address corresponding to the top 12 bits of the mask; A class A network with subnetting and a mask with 1's in its top 14 bits may be identified by the portion of an address corresponding to the top 14 bits of the mask; A class B network without subnetting may be identified by the portion of an address corresponding to the top two octets of its mask; A class B network with subnetting and a mask with 1's in its top 20 bits may be identified by the portion of an address corresponding to the top 20 bits of the mask; A class B network with subnetting and a mask with 1's in its top 23 bits may be identified by the portion of an address corresponding to the top 23 bits of the mask; A class C network without subnetting may be identified by the portion of an address corresponding to the top three octet of its mask; A class C network with subnetting and a mask with 1's in its top 27 bits may be identified by the portion of an address corresponding to the top 27 bits of the mask; and A class C network with subnetting and a mask with 1's in its top 29 bits may be identified by the portion of an address corresponding to the top 29 bits of the mask. And so on.

The system of FIG. 1 includes a number of nodes connected for data processing in a network. A node is a computer coupled to a network for data communications. In Unix parlance, a node is referred to as a 'host.' RFC793, the original Transmission Control Protocol ('TCP') specification from 1983, for example, refers to nodes as hosts. The 'node' terminology is somewhat more generic. Therefore 'node' is the terminology used in this specification to refer to a computer on a network.

Each of the nodes of the system of FIG. 1 may have a data communications module installed upon it capable of administering requests for data communications connections according to the present inventive subject matter. The data processing system of FIG. 1 includes servers (101, 102) connected to a wide-area network ('WAN')(100) through wireline connections (103, 104). Several other exemplary devices including a laptop (106), a personal digital assistant ('PDA') (110), a personal computer (114), and a network-enabled mobile phone (118) also connect to the WAN (100). In the example of FIG. 1, laptop (106) connects through a wireline connection (108) to WAN (100), and personal computer (114) connects through a wireline connection (116) to WAN (100). PDA (110) connects through wireless link (112) to WAN (100), and mobile phone (118) connects through wireless link (120) to WAN (100). Servers (101, 102) may provide a wide variety of services through network (100) to other network devices (106, 110, 114, and 118) that include, for example, HTTP or 'web' services, email services, instant messaging service, security services, applications services, and others as will occur to those of skill in the art.

In the system of FIG. 1, any exemplary device (101, 102, 106, 110, 114, and 118) may function as a 'sender' or a 'receiver' of a data communications connection according to the present inventive subject matter. In the terminology of this specification, a 'sender' is any node or process thereof capable of requesting a service or data provided by another node or process thereof. A physical device such as a server, a laptop, a PDA, or a desktop can be a sender. An application running on a node that relies on communication with another node can also be a sender. Such applications include e-mail clients, FTP clients and so on. A 'receiver' is a node or process thereof on an internet or other network that responds to requests or commands from a sender. Types of receivers include FTP servers, IRC servers, mail servers, news servers, web servers and so on. Any node or node process can function as a sender or a receiver, the distinguishing feature being the function rather than the device or process. When a server (101, 102) receives a request for services from another network device (106, 110, 114, and 118), the server (101, 102) functions as a receiver, and the other network device (106, 110, 114, and 118) functions as a sender. When a server (101, 102) responds to the network device (106, 110, 114, and 118) originating the service request, the server (101, 102) functions as a sender, and the other network device (106, 110, 114, and 118) functions as a receiver.

A sender may be characterized as 'local' or 'remote' depending on the sender's network location relative to a receiver. A sender having a network address on the network of the receiver may be characterized as 'local.' A sender having a network address on a network other than the receiver's network may be characterized as 'remote.' In the example of FIG. 1, server (102) and laptop (106) are both connected to network (126); the network portions of their addresses are the same. When laptop (106) sends a connection request to server (102), server (102) may examine the sender's network address, determine that the sender's network and the receiver's network are the same, characterize the sender as local, check the value of its location response flag, and, if the flag is to 'local,' accept the connection. If the flag was set to 'remote,' the receiver may drop the request without sending any response at all, thereby denying a potential attacker any information whatsoever regarding the receiver. Similarly, server (101) on network (124), upon receiving a connection request sent from personal computer (114), a node on another network (128), may characterize the sender as remote, and, if the receiver's location response flag is set to 'remote,' server (101) on network (124) will accept the connection. If the server's (101) location response flag was set to 'local,' the server may drop the request without response.

The arrangement of nodes and network connections making up the exemplary system illustrated in FIG. 1 is for explanation, not for limitation. In fact, systems for administering requests for data communications connections according to embodiments of the present inventive subject matter may include additional servers, routers, other devices, and peer-to-peer architectures, not shown in FIG. 1, as will occur to those of skill in the art. Systems for administering requests for data communications connections according to embodiments of the present inventive subject matter may be connected as LANs, WANs, intranets, internets, the Internet, webs, the World Wide Web itself, or other connections as will occur to those of skill in the art. Such networks are media that may be used to provide data communications connections between various nodes connected together within an overall data processing system. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present inventive subject matter may be implemented on a variety of hardware platforms in addition to those illustrated in FIG. 1.

Administering requests for data communications connections in accordance with the present inventive subject matter is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in administering requests for data communications connections according to embodiments of the present inventive subject matter. The computer (152) of FIG. 2 includes at least one computer processor (156) or 'CPU' as well as random access memory (168) ('RAM') which is connected through a system bus (160) to processor (156) and to other components of the computer. Stored in RAM (168) is an application program (151). Application programs useful in accordance with various embodiments of the present inventive subject matter include browsers, word processors, spreadsheets, database management systems, email clients, FTP clients, TELNET clients, proxy services, and so on, as will occur to those of skill in the art. Application program (151) in the example of FIG. 2 is shown in RAM (168), but many components of such software typically are stored in non-volatile memory (166) also.

Also stored in RAM (168) is an operating system (154). Operating systems useful in computers according to embodiments of the present inventive subject matter include UNIX™, Linux™, Microsoft NT™, AIX™, IBM's i5/OS™, and others as will occur to those of skill in the art. Transport and network layer software components such as TCP/IP clients and services are typically provided as components of operating systems, including Microsoft Windows™, IBM's AIX™, Linux™, and so on.

Operating system (154) includes a data communications module (186) such as a TCP service. Data communications module (186) of FIG. 2 includes computer program instructions for administering requests for data communications connections according to embodiments of the present inventive subject matter. Operating system (154) and data communications module (186) in the example of FIG. 2 are shown in RAM (168), but many components of such software typically are stored in non-volatile memory (166) also.

Figure 2:
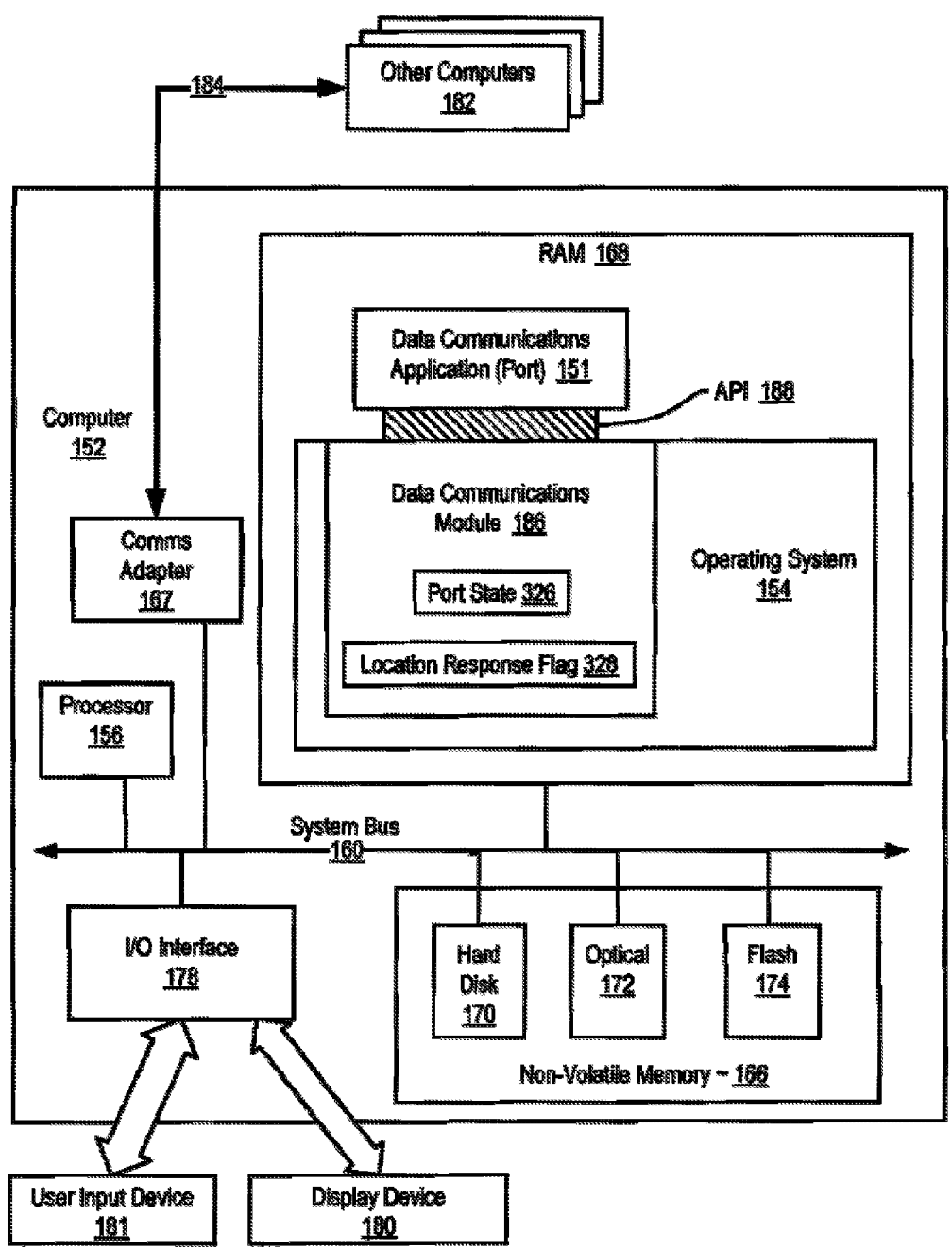
FIG. 2 sets forth a block diagram of automated computing machinery comprising an exemplary computer useful in administering requests for data communications connections according to embodiments of the present inventive subject matter.

Data communications module (186) of FIG. 2 provides one end of a data communications connection to application program (151) through an API (188). In TCP parlance, the endpoint of a data communications connection is a data structure called a 'socket.' Two sockets form a data communications connection, and each socket includes a port number and a network address for the respective data connection endpoint. Using the data communications connection, a node's application program operating in the software layer of the OSI data communications has the ability to send information to an application program of another node without regard for how the information travels from one node on a network to another. For example, a laptop's email client can send a request for new email messages to a mail server application through a socket to the TCP service on a laptop. The mail server application then receives the email client's request through a socket to the TCP service on the server and responds by sending the new email messages back through the socket to the server's TCP service. In the process of sending and receiving messages through the sockets, neither the email client nor the mail server has to manage the details of how the messages are delivered.

Application (151) uses sockets in the data communications module (186) through a set of functions supplied by the API (188). TCP's API provides a set of functions that include, for example: [0044] listen( ) activates a socket, instructing the data communications module that a server port is ready to begin operations, begin accepting connections on a socket [0045] accept( ) accepts a connection on a socket from the subsystem on a server [0046] acceptEx( ) accepts a new connection on a server and receives the first block of data sent by a client [0047] connectEx( ) requests a connection to a server from a client through a specified socket and optionally sends data when the connection is established [0048] connect( ) requests a connection to a server from a client on a specified socket [0049] send( ) sends a message through a connection on a server or a client [0050] recv( ) retrieves from the subsystem a message received on a connection to a calling application on a server or a client Data communications module (186) also includes a location response flag (328). As described in more detail below, data communications module (186) may be programmed for administering requests for data communications connections according to embodiments of the present inventive subject matter in dependence upon characterization of a sender as local or remote and also in dependence upon the value of the location response flag (328).

A port in a socket identifies a data communications application that carries out data communications operations through the socket. Each such port is said to have a state. This specification addresses two port states: open and closed. A closed port is a port that either does not exist or has not been instructed to listen. A closed port may not exist because no socket for it has been created. When a port exists, it is still considered closed until its socket is instructed to listen, by an application program calling listen( ) in the sockets API. An open port is a port that exists and has been instructed to listen. In the example of FIG. 2, data communications module (186) also includes a data element (326) representing the state of a port served by the data communications module. Data communications module (186) may be programmed for administering requests for data communications connections according to embodiments of the present inventive subject matter not only in dependence upon characterization of a sender as local or remote but also in dependence upon the receiver port state, that is, whether the port identified in a connection request is open in the receiver.

Data communications application (186) may be programmed to set the value of the location response flag by a subroutine call through application programming interface (188) for the data communications protocol. In the case of TCP, the API for the data communication protocol would be the sockets API. The sockets API are expanded according to embodiments of the present inventive subject matter to expose an interface to a function that sets the value of the location response flag. Providing such a function empowers the application program, and therefore the application programmer, to determine how the data communications module is to administer, requests for data communications connections according to embodiments of the present inventive subject matter. As described in more detail below, it is the value of the location response flag (328) that indicates whether to respond to requests according to the sender's characterization as local or remote. Supported values of the location response flag (328) typically include 'local' and 'remote.' An example of an API function for setting the value of a location response flag is: [0054] setLocResp( ) sets a location response flag to the value of a call parameter; may accept a parameter with value 'local' or 'remote.'

Computer (152) of FIG. 2 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out through serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present inventive subject matter include modems for wired dial-up communications, Ethernet (IEEE 802.3) adapters for wired network communications, and 802.11b adapters for wireless network communications.

Figure 3:
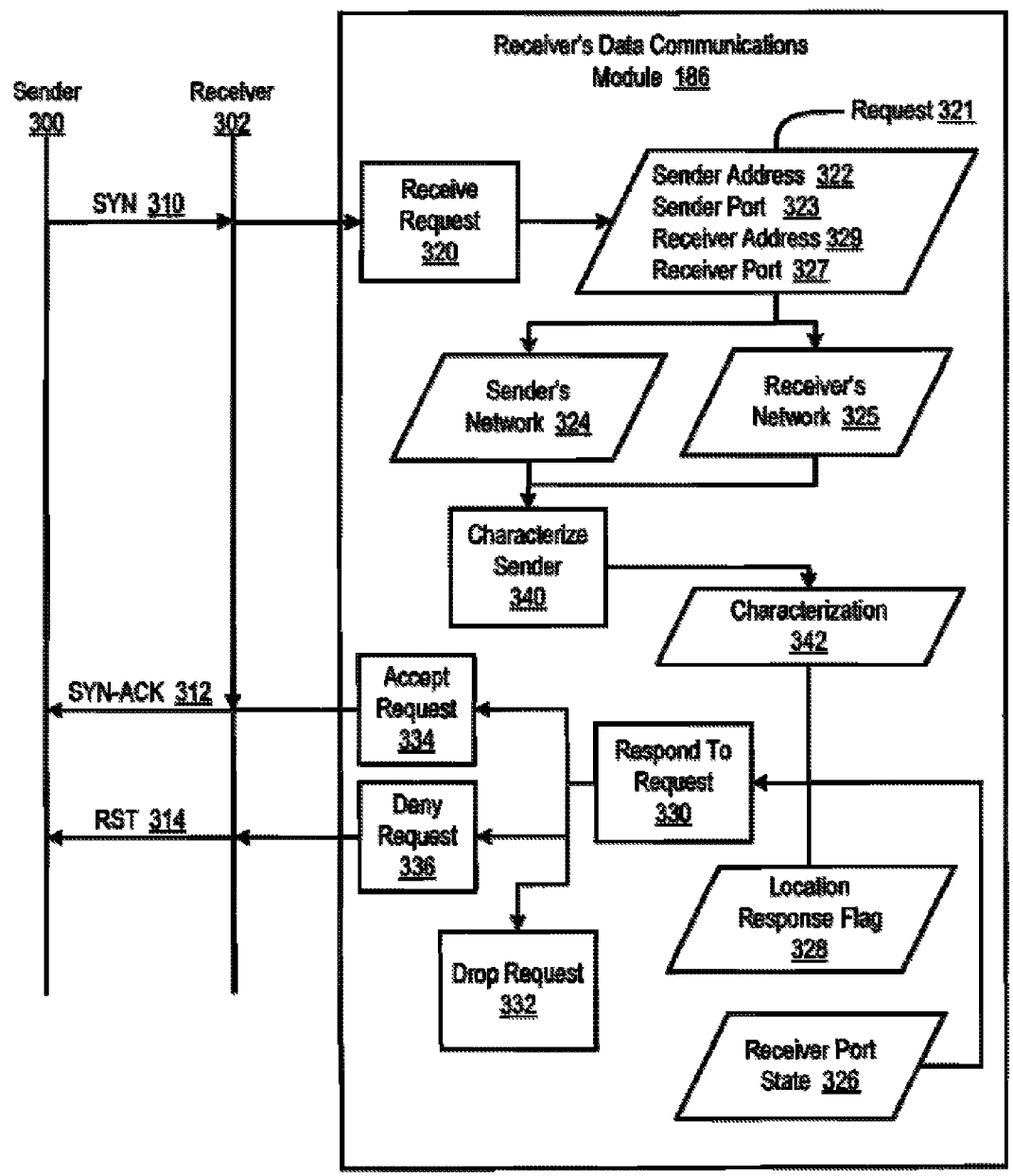
FIG. 3 sets forth a calling sequence diagram and flow chart illustrating an exemplary method for administering requests for data communications connections according to embodiments of the present inventive subject matter.

For further explanation, FIG. 3 sets forth a calling sequence diagram and flow chart illustrating an exemplary method for administering requests for data communications connections according to embodiments of the present inventive subject matter. The method of FIG. 3 includes receiving (320), according to a data communications protocol, by a receiver (302) from a sender (300), a request (321) for a data communications connection, wherein the sender has a network address (322) on a sender's network (324) and the receiver has a network address (329) on a receiver's network (325).

A sender (300) is any node or process thereof on a network capable of requesting a service or data provided by another node or process thereof on the network. A receiver (302) is any computer or process thereof on a network that responds to requests or commands from a sender. The sender (300) communicates with the receiver (302) by a data communications protocol, such as TCP. Examples in this specification are often describe with respect to TCP, but the use of TCP is not a requirement or limitation of the present inventive subject matter. Administering requests for data communications connections according to embodiments of the present inventive subject matter may be implemented through any connection-oriented protocol, including, for example, the Sequence Packet Exchange ('SPX') protocol and others as will occur to those of skill in the art, and the use of all such protocols is well within the scope of the present inventive subject matter.

In the example of FIG. 3, a sender's (300) TCP service initiates a data communications connection by sending the synchronize ('SYN') (310) message of FIG. 3 to a receiver's (302) TCP service. The sender's (300) TCP service transmits the SYN (310) message through a sender port assigned to the particular socket on the sender (300) by the TCP service. The sender's (300) TCP service may have initiated the SYN (310) message in response to an application program calling the 'connect( )' function for a particular socket on the sender (300). Transmitting a SYN (310) message is the first step to establishing a data communications connection in TCP.

In the example of FIG. 3, receiving (320), according to a data communications protocol, by a receiver (302) from a sender (300), a request (321) for a data communications connection may be carried out by a data communications module (186), such as a TCP service, installed on the receiver (302). Receiving (320) a connection request (321) from a sender (300) may include identifying a SYN (310) message as a request (321) for a data communications connection. Receiving (320) a connection request (321) may also include extracting information from the SYN (310) message and storing the extracted information in a connection request (321) data structure. The connection request data structure may be a structure used to represent a connection, such as, in the example of TCP, a Transmission Control Block or 'TCB.'

The connection request (321) of FIG. 3 includes a sender network address (322) and a sender port (323) that identifies a particular socket of the sender (300) requesting a data connection with the receiver (302). Similarly, the receiver network address (329) and the receiver port (327) included in the connection request (321) of FIG. 3 identifies the particular receiver socket for which the sender (300) requests a connection. Once a connection has been established between the sockets of the sender (300) and receiver (302), the sender (300) may transmit data through the sockets to the receiver (302). The receiver (302) may then respond to the sender (300) through the sockets as well. In TCP terminology, the receiver's data communications module (186) of FIG. 3 receives (320) the sender port (323) and the receiver port (327) from the TCP header of the SYN (310) message. In the method of FIG. 3, the receiver's data communications module (186) may obtain the sender network address (322) and the receiver network address (329) by API calls to the network layer of its protocol stack.

In the method of FIG. 3, the sender's network (324) and the receiver's network (325) are represented in data in a receiver's data communications module (186). The sender's network (324) and the receiver's network (325) store respective values representing the networks on which the sender and receiver are located. The sender (300) of FIG. 3 has a network address on the sender's network. Similarly, the receiver (302) of FIG. 3 has a network address on the receiver's network. As described in detail at FIG. 1, the sender's network and the receiver's network form portions of a larger wide-area network.

The method of FIG. 3 also includes characterizing (340) the sender (300). The sender (300) may be characterized as local with respect to the receiver's network (325) if the sender's network (324) is the receiver's network, and the sender (300) may be characterized (340) as remote with respect to the receiver's network (325) if the sender's network (324) is not the receiver's network. In the example of FIG. 3, characterizing (340) the sender (300) is carried out by a data communications module (186) on the receiver (302). In the method of FIG. 3, characterizing (340) the sender (300) provides a sender characterization (342) as data in the data communications module (186) on the receiver (302).

The method of FIG. 3 includes a location response flag (328) represented in data in a receiver's data communications module (186), such as a TCP service. The location response flag (328) supports values corresponding to 'local' and 'remote.' For example, 'local' may be stored in the location responds flag (328) as a binary '0', while 'remote' may be stored as a binary '1.' A value corresponding to 'local' indicates that the data communications module (186) does not respond to a remote sender, that is the TCP service drops the remote sender's SYN messages. A value of 'remote' indicates that the data communications module does not respond to a local sender, that is the TCP service drops the local sender's SYN messages. As mentioned above, a sender may be characterized as 'local' or 'remote' depending on the sender's network location relative to a receiver. A sender having a network address on the network of the receiver may be characterized as 'local.' A sender having a network address on a network other than the receiver's network may be characterized as 'remote.'

The method of FIG. 3 also includes responding (330) to the request (321) in dependence upon a value of a location response flag (328) and in dependence upon the characterization (342) of the sender's network (324) with respect to the receiver's network (325). In FIG. 3, responding (330) to the connection request (321) is carried out by a data communication module (186) installed on the receiver (302) such as a TCP service. Responding (330) to the connection request according to the method of FIG. 3 may include accepting (334) the connection request (321), denying (336) the connection request (321), or dropping (332) the connection request (321).

In the example of FIG. 3, accepting (334) the connection request (321) includes responding to the sender's SYN (310) message with a SYN and acknowledge ('ACK') (312) message, sometimes referred to as a SYN-ACK message. Accepting the connection request (321) according to FIG. 3 may be carried out in the receiver's TCP service by setting the SYN and ACK control bits of a TCP message header and transmitting the TCP message to the sender (300). Accepting (334) the connection request (321) with the SYN-ACK (312) message acknowledges the sender's SYN (310) and synchronizes the sender (300) with the receiver's (302) sequencing numbers. Responding with a SYN-ACK (312) informs the sender's (300) TCP service that the receiver's (302) TCP service accepts the request for a data communications connection on the receiver's port specified in the SYN (310) message. After responding with a SYN-ACK (312), the connection will be established when the receiver (302) receives an ACK (not shown) from the sender (300).

Denying (336) the connection request (321) according to the method of FIG. 3 includes responding to the sender's (300) SYN (310) with a reset ('RST') message. In the method of FIG. 3, denying (336) the connection request (321) may be carried out in the receiver's TCP service by setting the RST control bit of a TCP message header and transmitting the TCP message to the sender (300). Denying (336) the connection request with a RST (314) message informs the sender (300) that a TCP service on the receiver (302) refuses the connection request. Denying (336) with the RST (314) message however informs the sender (300) that the receiver's TCP service is monitoring the port specified by the sender's SYN (310) message.

In the example of FIG. 3, dropping (332) the connection request (321) may be carried out by the receiver's TCP service by discarding the connection request (321). Dropping (332) provides the sender (300) neither a SYN-ACK (312) message nor a RST (314) message. In contrast to accepting (334) or denying (336) the connection request, dropping (332) the connection request advantageously supplies no information to the sender (300) regarding the receiver (302). From the perspective of the sender (300), the SYN (310)

message may appear lost or the receiver and port specified in the SYN (310) message may appear nonexistent.

Figure 4:
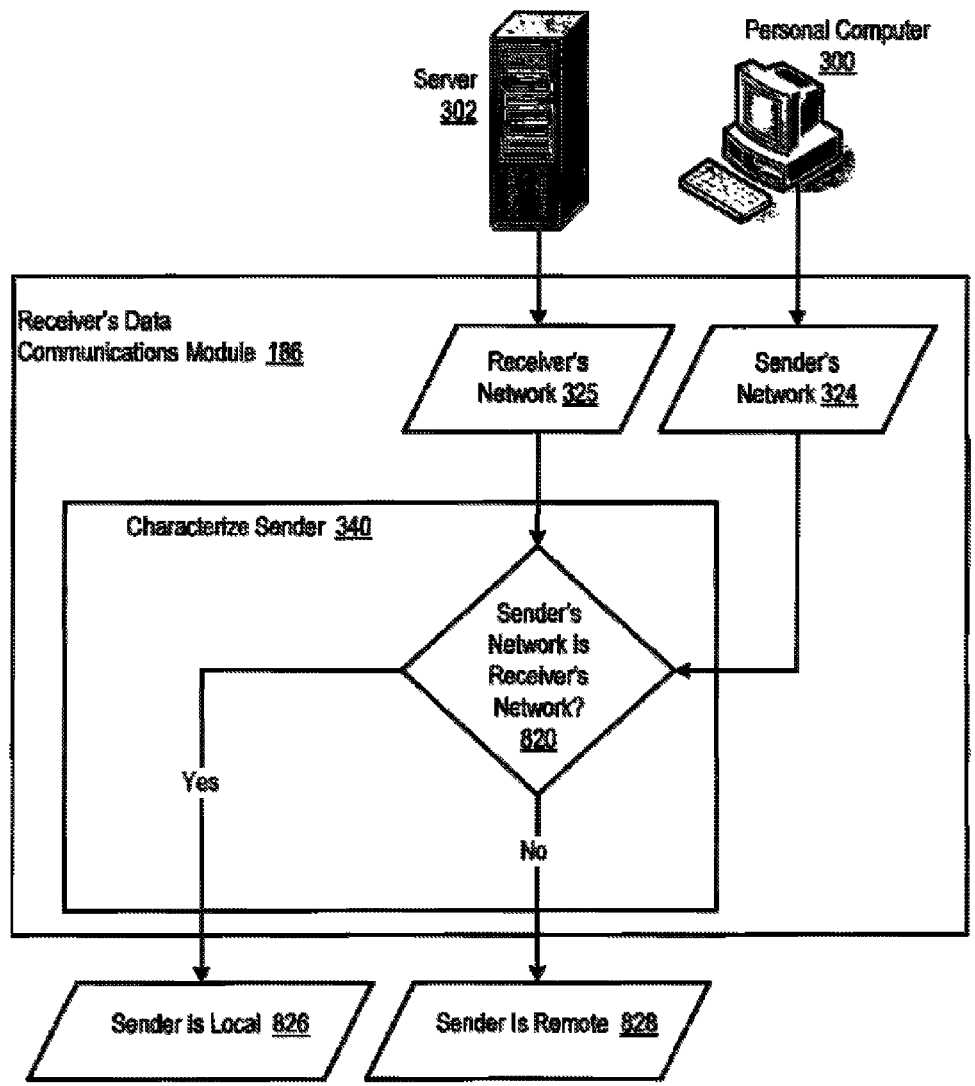
FIG. 4 sets forth a flow chart illustrating an exemplary method of characterizing a sender according to embodiments of the present inventive subject matter.

For further explanation, FIG. 4 sets forth a flow chart illustrating an exemplary method of characterizing a sender according to embodiments of the present inventive subject matter. The method of FIG. 4 includes characterizing (340) the sender (300) as local with respect to the receiver's network (325) if the sender's network (324) is the receiver's network. The method of FIG. 4 also includes characterizing (340) the sender (300) as remote with respect to the receiver's network (325) if the sender's network (324) is not the receiver's network. The sender (300) of FIG. 4 is a personal computer that has a network address on the sender's network. The receiver (302) of FIG. 4 is a server that has a network address on the receiver's network. Personal computers request a data communications connection to a server when accessing files, scripts, and so on stored on the server.

In the method of FIG. 4, the sender's network (324) and the receiver's network (325) are represented in data as the bits in a full network address corresponding to 1's in an address mask. Data elements representing the sender's network (324) and the receiver's network (325) respectively store values representing the networks on which the sender (300) and receiver (302) are located. The data communications module (186) may obtain the sender's network (324) from the result of a logical AND of the sender's network address with the receiver's network mask. Similarly, the data communications module (186) may obtain the receiver's network (325) from the result of a logical AND of the receiver's network address with the receiver's network mask.

In the method of FIG. 4, characterizing (340) the sender includes determining (820) whether the sender's network (324) is the receiver's network (325). Determining (820) whether the sender's network (324) is the receiver's network (325) may be carried out by comparing the value of the receiver's network (325) with the value of the sender's network (324) for equality. The data communications module (186) characterizes the sender as 'local' (826) if the sender's network (324) is the receiver's network (325). The data communications module (186) characterizes the sender as 'remote' (828) if the sender's network (324) is not the receiver's network (325).

Figure 5:
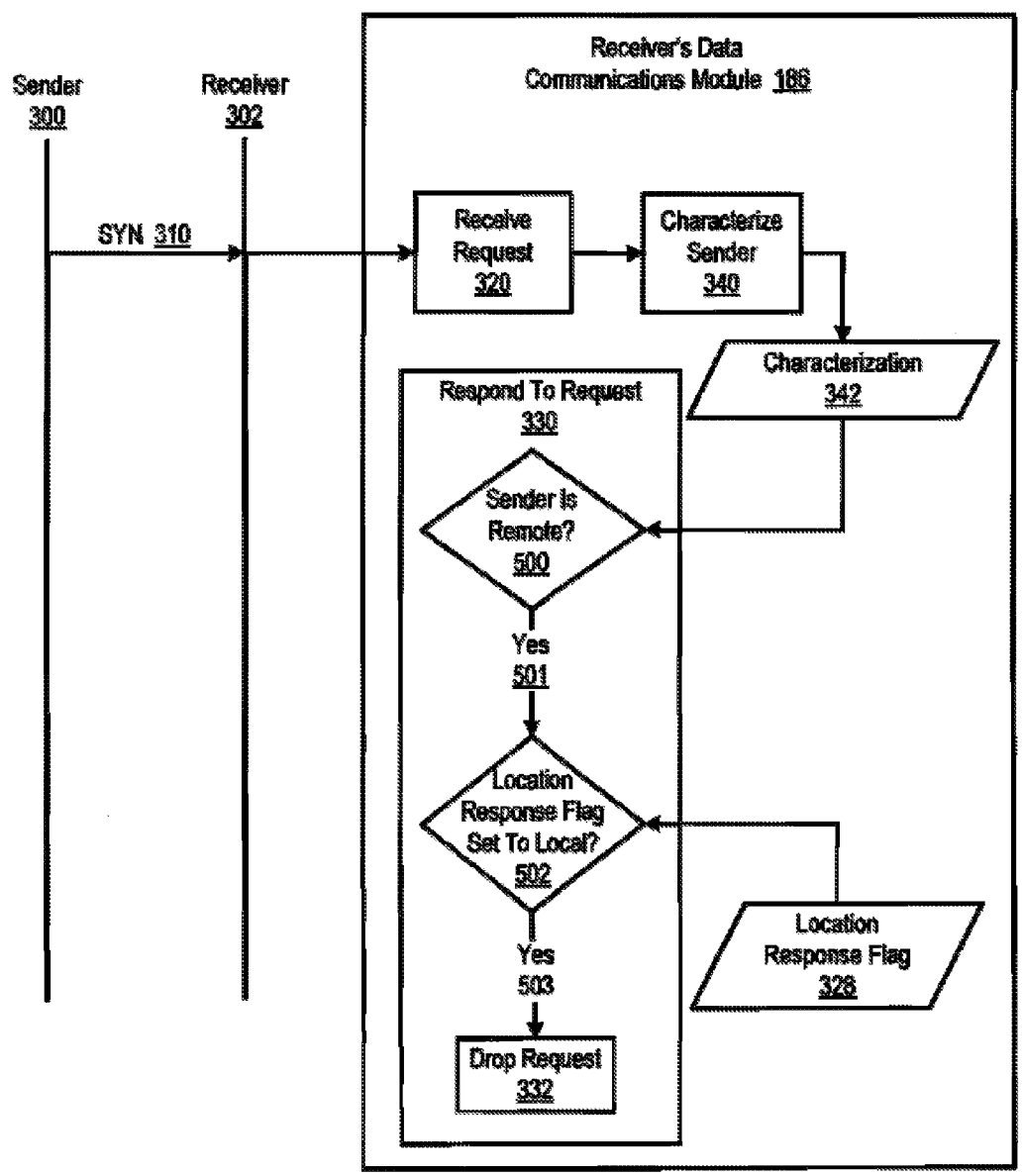
FIG. 5 sets forth a calling sequence diagram and flow chart illustrating a further exemplary method for administering requests for data communications connections according to embodiments of the present inventive subject matter.

For further explanation, FIG. 5 sets forth a calling sequence diagram and flow chart illustrating a further exemplary method for administering requests for data communications connections according to embodiments of the present inventive subject matter. The method of FIG. 5 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 5, however, responding (330) to the request is carried out by dropping (332) the request if the value of the location response flag (328) is set to 'local' (503) and the sender (300) is characterized as remote (501). This method is particularly useful, for example, in providing enterprise services to local users, when local requests for connections to open ports may be accepted and local requests for connections to closed ports may be reset in the traditional fashion because local users are relatively trusted. Remote users, however, are given no response whatsoever, not even a reset, thereby denying them any information whatsoever regarding the receiver.

Figure 6:
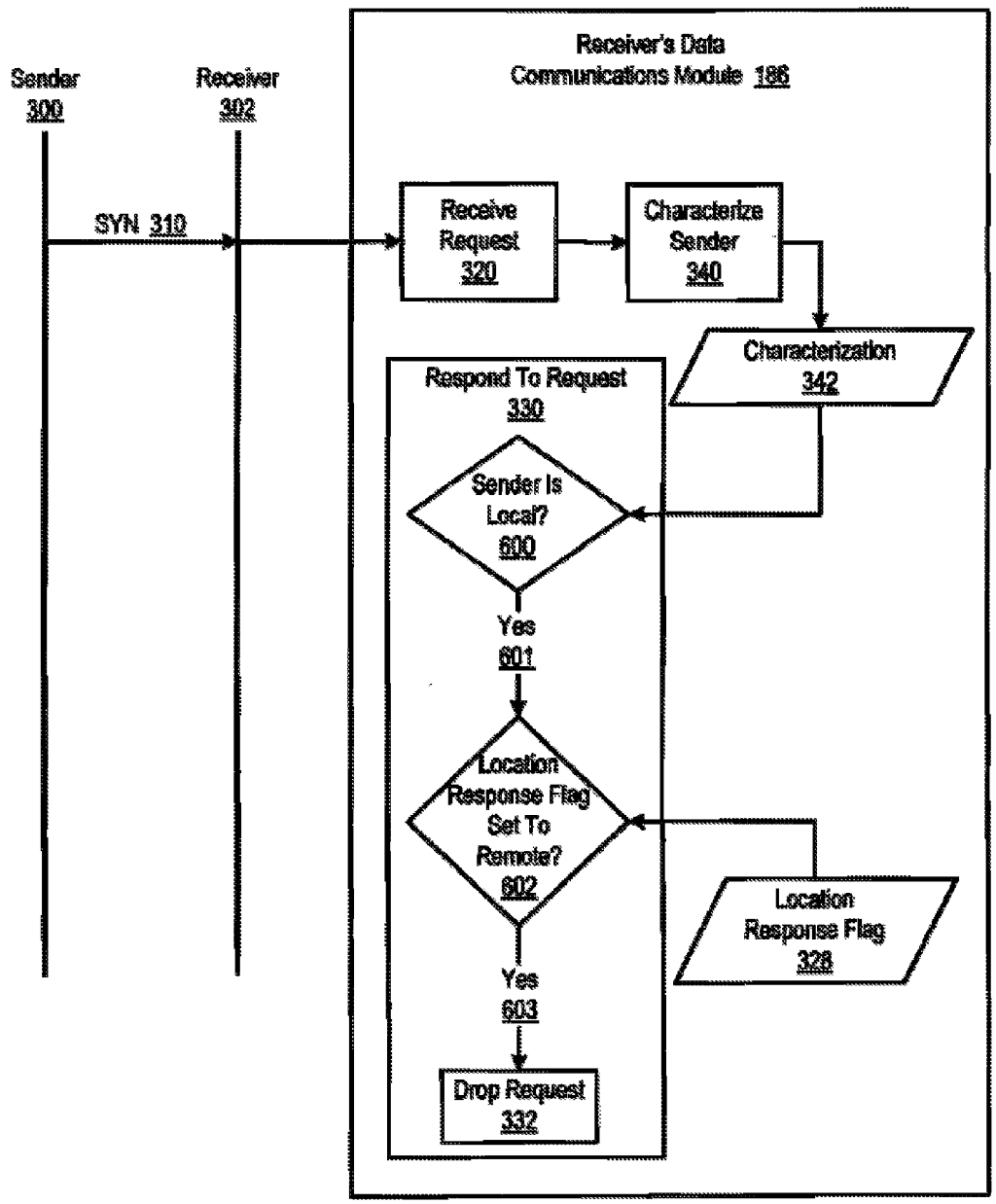
FIG. 6 sets forth a calling sequence diagram and flow chart illustrating a still flirter exemplary method for administering requests for data communications connections according to embodiments of the present inventive subject matter.

For further explanation, FIG. 6 sets forth a calling sequence diagram and flow chart illustrating a still further exemplary method for administering requests for data communications connections according to embodiments of the present inventive subject matter. The method of FIG. 6 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 6, however, responding (330) to the request is carried out by dropping (332) the request if the value of the location response flag (328) is set to 'remote' (603) and the sender (300) is characterized as local (601). This method is particularly useful, for example, in providing online commercial services to remote users, when local users ought not be requesting connections through the addresses and ports exposed for commercial use. In this example, remote requests for connections to open ports may be accepted and remote requests for connections to closed ports may be reset in the traditional fashion because connections from remote user are desired. Local users, however, are given no response whatsoever, not even a reset, thereby denying them any information whatsoever regarding the receiver.

As mentioned above in the discussion of the system of FIG. 2, a receiver may have a receiver port having a state. With reference to FIG. 3: In the method of FIG. 3 responding (330) to a request (321) may be carried out, not only in dependence upon the characterization (342) of the sender and the value of the location response flag (328), but also in dependence upon the receiver port state (326). For further explanation of the use of the port state, FIG. 7 sets forth a calling sequence diagram and flow chart illustrating a further exemplary method of administering requests for data communications connections according to embodiments of the present inventive subject matter.

Figure 7:
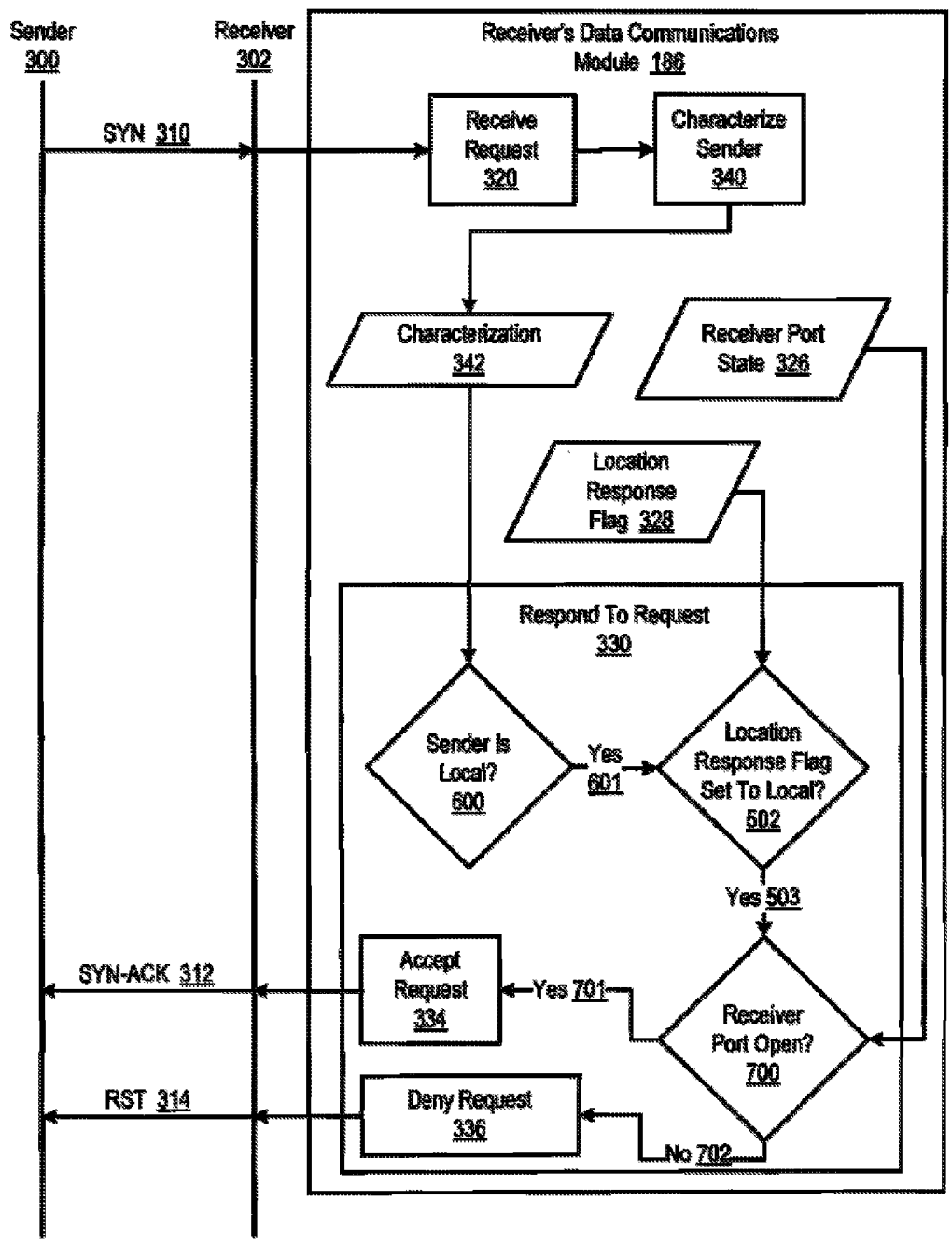
FIG. 7 sets forth a calling sequence diagram and flow chart illustrating a further exemplary method of administering requests for data communications connections according to embodiments of the present inventive subject matter.

The method of FIG. 7 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 7, however, the receiver (302) may include a receive port, such as, for example, the data communications application illustrated at reference (152) on FIG. 2, and the receive port may have a receive port state (326).

The method of FIG. 7 includes determining (700) whether the receive port is open. Whether the receive port is open is the value of the port's state. That is, the port state is either open or closed. Receiver's data communications module (186) may, for example, maintain a list of the port numbers of the ports presently existing and listening on a socket. Or the port state may be inferred from data structures representing ports such as, for example, sockets or TCBs. In the case of TCP, for example, if no Transmission Control Block ('TCB') exists with a socket having a port number matching the receiver port number in the request for a connection, the port does not exist on the receiver and may therefore be considered closed.

In the method of FIG. 7, if the state (326) of the port is that the port is open (701) on the receiver (302), responding (330) to the request is carried out by accepting (334) the request if the value of the location response flag (328) is set to 'local' (503) and the sender (300) is characterized as local (601). In the example of TCP, accepting (334) the request by be carried out by transmitting a SYN-ACK message (312) from receiver (302) to sender (300) and then eventually completing a three way handshake to effect a connection.

Further in the method of FIG. 7, if the state (326) of the port is that the port is closed (702) on the receiver (302), responding (330) to the request is carried out by denying (336) the request if the value of the location response flag (328) is set to 'local' (503) and the sender (300) is characterized as local (601). In the example of TCP, denying (336) the request may be implemented by transmitting a reset message (314) from receiver (302) to sender (300).

Figure 8:
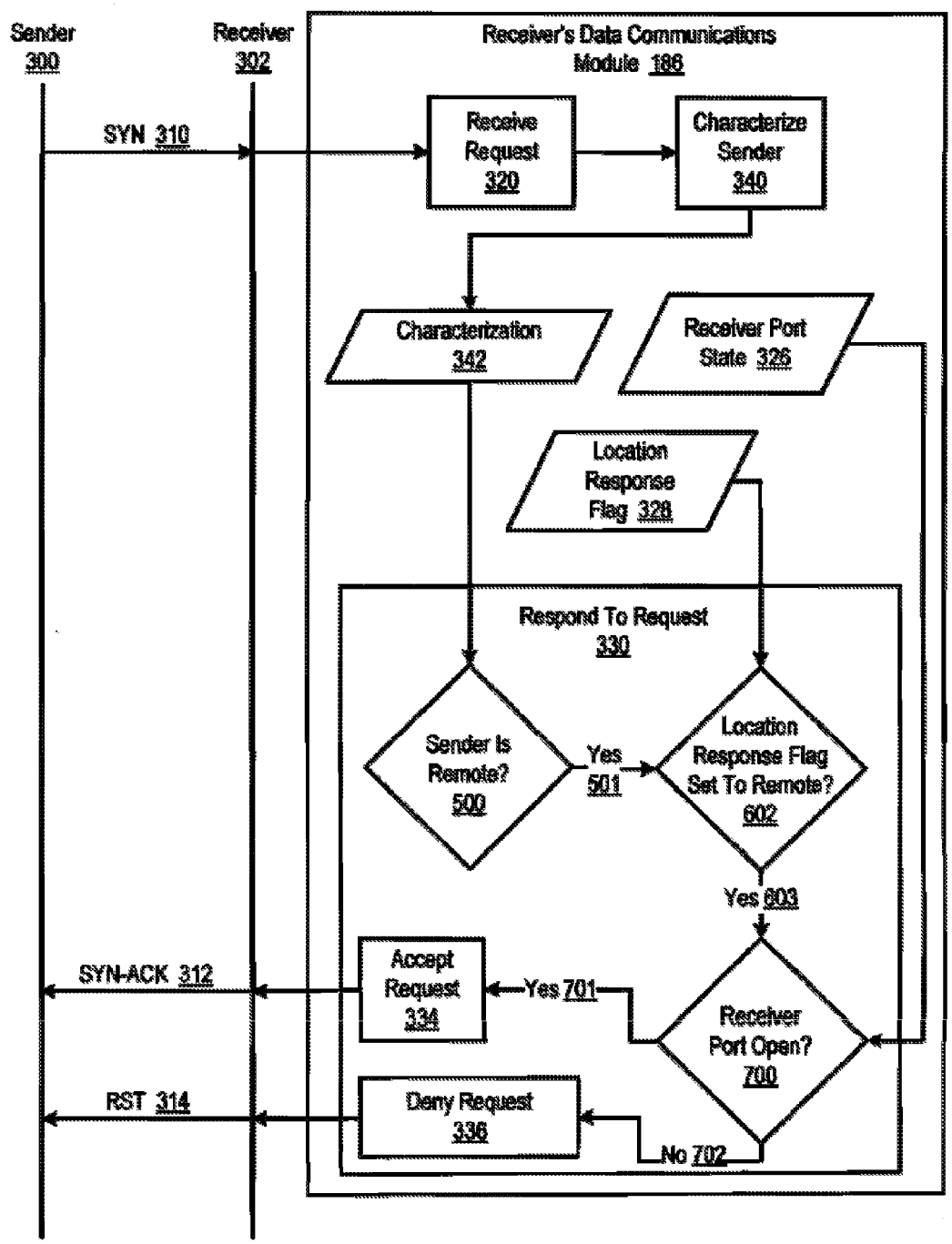
FIG. 8 sets forth a calling sequence diagram and flow chart illustrating a further exemplary method of administering requests for data communications connections according to embodiments of the present inventive subject matter.

For further explanation of the use of the port state, FIG. 8 sets forth a calling sequence diagram and flow chart illustrating a further exemplary method of administering requests for data communications connections according to embodiments of the present inventive subject matter. The method of FIG. 8 includes receiving (320) a request (321) for a data communications connection, characterizing (340) the sender (300), and responding (330) to the request (321) in dependence upon a value of a location response flag (328) and in dependence upon the characterization (342) of the sender's network (324) with respect to the receiver's network (325), all implemented in a similar fashion as the method of FIG. 3. In the method of FIG. 8, however, the receiver may include a receive port (not shown) having a receive port state (326).

The method of FIG. 8 includes determining (700) whether the receive port is open. In the method of FIG. 8, if the state (326) of the port is that the port is open (701) on the receiver (302), responding (330) to the request may be carried out by accepting (334) the request if the value of the location response flag (328) is set to 'remote' (603) and the sender (300) is characterized as remote (501). In the example of TCP, accepting (334) the request by be carried out by transmitting a SYN-ACK message (312) from receiver (302) to sender (300) and then eventually completing a three way handshake to effect a connection.

Further in the method of FIG. 8, if the state (326) of the port is that the port does not exist (702) on the receiver (302), responding (330) to the request may be carried out by denying (336) the request if the value of the location response flag (328) is set to 'remote' (603) and the sender is characterized as remote (501). In the example of TCP, denying (336) the request may be implemented by transmitting a reset message (314) from receiver (302) to sender (300).

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, techniques for establishing a data communication connection based on network locations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

It will be understood from the foregoing description that modifications and changes may be made in various embodiments of the present inventive subject matter without departing from its true spirit. The descriptions in this specification are for purposes of illustration only and are not to be construed in a limiting sense. The scope of the present inventive subject matter is limited only by the language of the following claims.

What is claimed is:

1. A method comprising:
   receiving a request to establish a data communication connection, wherein the request indicates a network address of a sender;
   determining whether the sender is local or remote with respect to a receiver of the request based, at least in part, on the network address of the sender and a network address of the receiver, wherein the sender is local with respect to the receiver if the network address of the receiver and the network address of the sender identify a same network, and the sender is remote with respect to the receiver if the network address of the receiver and the network address of the sender identify different networks;
   determining whether a location response flag indicates remote or local;
   allowing the data communication connection to be established between the sender and the receiver if the location response flag indicates local and the sender was determined to be local with respect to the receiver;
   allowing the data communication connection to be established between the sender and the receiver if the location response flag indicates remote and the sender was determined to be remote with respect to the receiver;
   preventing the data communication connection from being established between the sender and the receiver if the location response flag indicates remote and the sender was determined to be local with respect to the receiver; and
   preventing the data communication connection from being established between the sender and the receiver if the location response flag indicates local and the sender was determined to be remote with respect to the receiver.

2. The method of claim 1 further comprising:
   determining whether a state of a port of the receiver is open or closed, wherein the request indicates the port;
   wherein said allowing the data communication connection to be established between the sender and the receiver depends upon the state of the port being open;
   wherein said preventing the data communication connection from being established between the sender and the receiver comprises dropping the request if the state of the port is closed and denying the request if the state of the port is open.

3. The method of claim 2, wherein said denying the request comprises sending a reset message to the sender.

4. The method of claim 2 further comprising:
   denying the request if the state of the port is closed, and if the location response flag indicates local and the sender was determined to be local with respect to the receiver; and
   denying the request if the state of the port is closed, and if the location response flag indicates remote and the sender was determined to be remote with respect to the receiver.

5. The method of claim 1, wherein said determining whether the sender is local or remote with respect to the receiver of the request based, at least in part, on the network address of the sender and a network address of the receiver comprises performing a logical AND operation on the network address of the sender and a network address mask of the receiver.

6. The method of claim 1, wherein the network address of the sender and the network address of the receiver comprise Internet Protocol addresses.

7. The method of claim 1, wherein the request comprises a synchronize message.

8. A computer program product for processing data communication connection requests, wherein the computer program product comprises:
   a non-transitory machine-readable storage medium encoded with computer usable program code, the computer usable program code comprising computer usable program code configured to:
   determine whether a sender of a request for a data communication connection is local or remote with respect to a receiver of the request based, at least in part, on a network address of the sender and a network address of the receiver, wherein the request indicates the network address of the sender, wherein the sender is local with respect to the receiver if the network address of the receiver and the network address of the sender identify a same network, and the sender is remote with respect to the receiver if the network address of the receiver and the network address of the sender identify different networks;
   determine whether a location response flag indicates remote or local;
   allow the data communication connection to be established between the sender and the receiver if the location response flag indicates local and the sender is determined to be local with respect to the receiver;
   allow the data communication connection to be established between the sender and the receiver if the location response flag indicates remote and the sender is determined to be remote with respect to the receiver;

prevent the data communication connection from being established between the sender and the receiver if the location response flag indicates remote and the sender is determined to be local with respect to the receiver; and prevent the data communication connection from being established between the sender and the receiver if the location response flag indicates local and the sender is determined to be remote with respect to the receiver.

9. The computer program product of claim 8, wherein the computer usable program code is further configured to:

determine whether a state of a port of the receiver is open or closed, wherein the request indicates the port;

wherein the computer usable program code is configured to allow the data communication connection to be established between the sender and the receiver in dependence upon the state of the port being open;

wherein the computer usable program code being configured to prevent the data communication connection from being established between the sender and the receiver comprises the computer usable program code being configured to drop the request if the state of the port is closed and to deny the request if the state of the port is open.

10. The computer program product of claim 9, wherein the computer usable program code configured to deny the request comprises the computer usable program code configured to send a reset message to the sender.

11. The computer program product of claim 9, wherein the computer usable program code is further configured to:

deny the request if the state of the port is closed, and if the location response flag indicates local and the sender was determined to be local with respect to the receiver; and deny the request if the state of the port is closed, and if the location response flag indicates remote and the sender was determined to be remote with respect to the receiver.

12. The computer program product of claim 8, wherein the computer usable program code configured to determine whether the sender is local or remote with respect to the receiver of the request based, at least in part, on the network address of the sender and the network address of the receiver comprises the computer usable program code configured to perform a logical AND operation on the network address of the sender and a network address mask of the receiver.

13. The computer program product of claim 8, wherein the network address of the sender and the network address of the receiver comprise Internet Protocol addresses.

14. The computer program product of claim 8, wherein the request comprises a synchronize message.

15. An apparatus comprising:
a processor;
a communication adapter operable to receive a request for a data communications connection;
a system bus coupled with the processor and the communications adapter; and
a data communications module, the data communications module operable to,
determine whether a sender of the request is local or remote with respect to the apparatus based, at least in part, on a network address of the sender and a network address of the apparatus, wherein the request indicates the network address of the sender, wherein the sender is local with respect to the receiver if the network address of the receiver and the network address of the sender identify a same network, and the sender is remote with respect to the receiver if the network address of the receiver and the network address of the sender identify different networks;

determine whether a location response flag indicates remote or local;

allow the data communication connection to be established between the sender and the apparatus if the location response flag indicates local and the sender is determined to be local with respect to the apparatus;

allow the data communication connection to be established between the sender and the apparatus if the location response flag indicates remote and the sender is determined to be remote with respect to the apparatus;

prevent the data communication connection from being established between the sender and the apparatus if the location response flag indicates remote and the sender is determined to be local with respect to the apparatus; and prevent the data communication connection from being established between the sender and the apparatus if the location response flag indicates local and the sender is determined to be remote with respect to the apparatus.

16. The apparatus of claim 15, wherein the data communications module is further operable to:

determine whether a state of a port of the receiver is open or closed, wherein the request indicates the port;

wherein the data communications module is operable to allow the data communication connection to be established between the sender and the apparatus in dependence upon the state of the port being open;

wherein the data communications module being operable to prevent the data communication connection from being established between the sender and the apparatus comprises the data communications module being operable to drop the request if the state of the port is closed and to deny the request if the state of the port is open.

17. The apparatus of claim 16, wherein the data communications module being operable to deny the request comprises the data communications module being operable to send a reset message to the sender.

18. The apparatus of claim 16, wherein the data communications module is further operable to:

deny the request if the state of the port is closed, and if the location response flag indicates local and the sender was determined to be local with respect to the apparatus; and deny the request if the state of the port is closed, and if the location response flag indicates remote and the sender was determined to be remote with respect to the apparatus.

19. The apparatus of claim 15, wherein the data communications module being operable to determine whether the sender is local or remote with respect to the apparatus based, at least in part, on the network address of the sender and the network address of the apparatus comprises the data communications module operable to perform a logical AND operation on the network address of the sender and a network address mask of the apparatus.

20. The apparatus of claim 15 further comprising a computer readable storage medium having stored therein computer usable program code that embodies the data communication module.

* * * * *